UNITED STATES PATENT OFFICE.

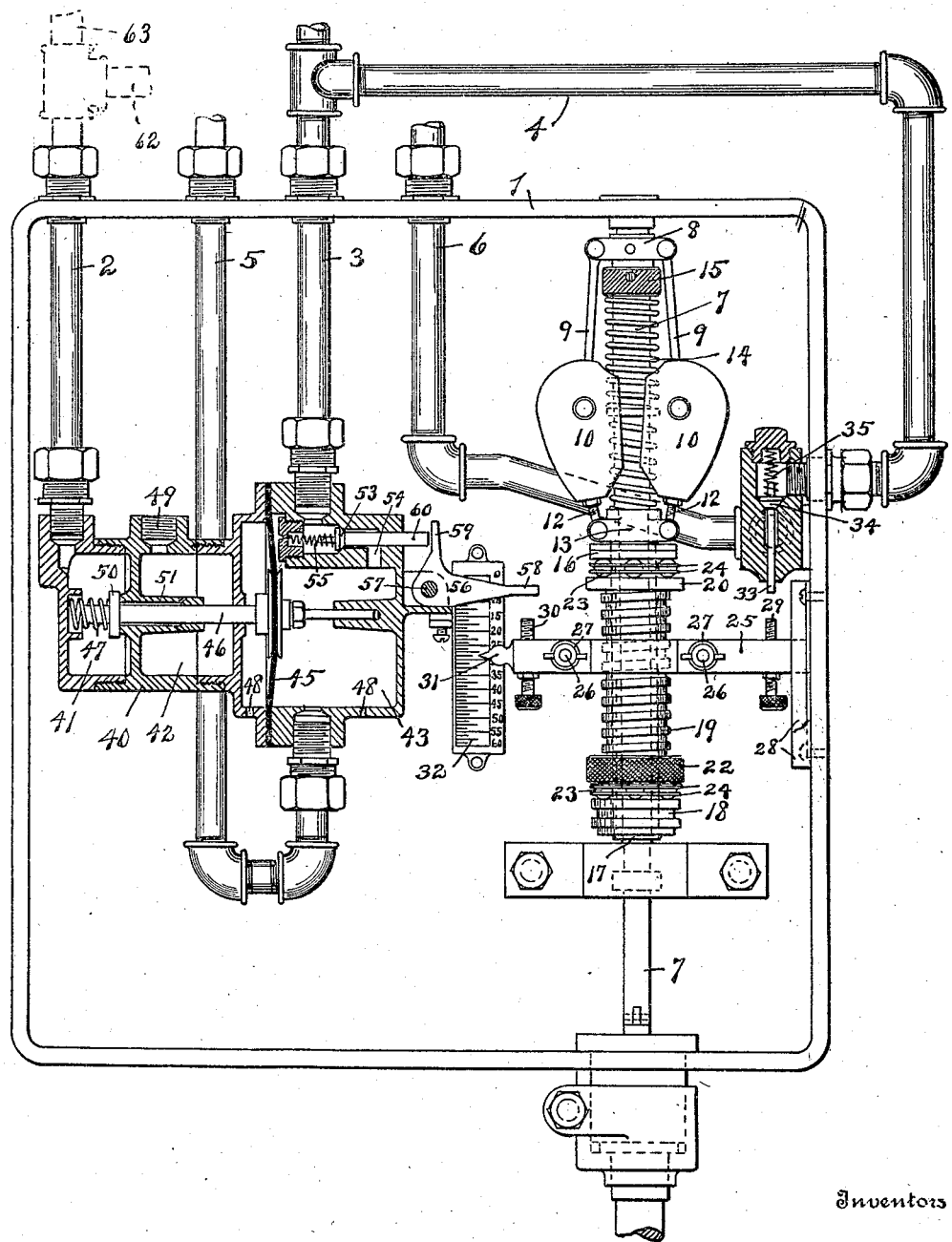

MAURICE E. HAMILTON, OF SPRINGFIELD, MISSOURI, AND WILLIAM H. JOHNSON, OF TERRE HAUTE, INDIANA.

SPEED-CONTROLLER.

1,277,718.   Specification of Letters Patent.   Patented Sept. 3, 1918.

Application filed March 4, 1918. Serial No. 220,162.

*To all whom it may concern:*

Be it known that we, MAURICE E. HAMILTON and WILLIAM H. JOHNSON, citizens of the United States, and residing at Springfield, county of Greene, and State of Missouri, and Terre Haute, county of Vigo, and State of Indiana, respectively, have invented a new and Improved Speed-Controller, of which the following is a specification.

This invention relates to means for causing the application of the air-brakes of vehicles when predetermined speeds are exceeded, and its object is to provide a readily adjustable mechanism for causing the release of the pressure in the equalizing reservoir of an automatic air-brake system of the vehicle, or the application of pressure when a "straight" air-brake system is used, when certain adjustable parts of the device have been moved predetermined distances by reason of the speed of the vehicle. A further object of this invention is to provide an audible signal which will be operated when the vehicle approaches closely the predetermined maximum speed. Another object of this invention is to provide a device of this character in which all the valves shall be of the puppet type and can therefore be kept tight with a minimum of labor.

The accompanying drawing is a view showing this improved speed controller within a case from which the corner has been removed, the control valve being shown in section.

The case 1 is intended to be closed and locked so that the engineer, motor-man or whoever else is in charge of the vehicle on which the device is mounted, cannot have access to the mechanism therein. Several pipes enter the case, the pipe 2 connecting to the equalizing reservoir of the air brake system, the pipes 3 and 4 to the main air reservoir of the air-brake system, the pipe 5 to a main whistle or to a direct acting air-brake and to a shut-off governor in the cab if one is employed, and the pipe 6 to an auxiliary whistle. A shaft 7 is driven in any desired manner from one of the track wheels of the vehicle and extends up to the top of the case where it connects to the governor.

The governor is of well known construction and consists of a cross bar 8 secured to the shaft 7, arms 9 pivoted to this cross bar and carrying weights 10, links 12 connecting these weights to a collar 13 which is slidable on the shaft against the thrust of a spring 14 which is regulated by means of an adjustable collar 15 secured to the shaft 7. A bearing flange 16 connects to the bottom of the collar 13.

A sleeve 17 indicated in dotted lines extends down from the flange 16 to the collar 18, and on this sleeve a threaded sleeve 19 is rotatably mounted. The outer sleeve has a bearing flange 20 at its upper end and a collar 22 having a bearing face on its lower end. Rings of balls 23 are held between the flanges 16 and 19 and the collars 18 and 22 by the cages 24 which are conventionally indicated. The inner sleeve 17 turns within the outer sleeve 19 which is held from turning by a bar 25, preferably formed of two similar parts held together by means of bolts 26 and nuts 27, the bar being threaded to receive the sleeve 19 which can be turned therein by means of the collar 22 when the nuts 27 are slacked a little. The bar is kept from turning by having one end slidable between guides 28.

The bar 24 carries two contact screws 29 and 30 and a pointer 31 that moves adjacent a graduated scale 32 supported by the case. When the bar 25 has been carried up sufficiently by the action of the governor weights, the screw 29 will engage the stem 33 of the valve 34 and move it upward in its casing against the force of the spring 35 and open the passage between the pipes 4 and 6, permitting air to flow from the main reservoir to an alarm whistle to indicate to the engineer or motorman that the vehicle is approaching a predetermined speed.

The main valve casing 40 has three chambers 41, 42 and 43, the latter inclosing a diaphragm 45 on the stem 46, normally held to the right in the drawing by means of a spring 47 on the stem 46. The chamber 43 has relief openings 48 and the chamber 42 a discharge opening 49. On the stem 46 is a main valve 50 which normally closes the passages 51 around this stem between the chambers 41 and 42.

A control valve 53 normally closes the passage 54 between the pipe 3 from the main air reservoir and the chamber 43 under tension of the springs 55. A bell crank lever 56 mounted on pin 57 has an arm 58 projecting into the path of the screw 30 and another arm 59 adapted to engage the stem 60 of the control valve 53.

The operation of this mechanism is as follows:—

When the vehicle is at rest, the nuts 27 are slacked to release the outer sleeve 19 which is turned by means of the collar 22 until the pointer 30 is opposite the graduation corresponding to the maximum speed the vehicle is to travel. In the present case this is about 29 miles or kilometers per hour. The nuts 27 are then turned down to lock the bar 25 to the sleeve 19.

When the vehicle begins to move, the weights 10 of the governor swing out and raise the bar 25 more and more as the speed increases. Just before the predetermined maximum speed is reached, the engineer will be notified thereof through opening of the valve 34 as before stated. If the speed still increases, the screw 30 will engage the bell-crank lever 56 and move the valve 53 from its seat. This will permit air to flow from the pipe 3 into the chamber 43 and out through the pipe 5 to a whistle, to a direct-acting air brake, to a throttle, to a rheostat governor or to any other safety device which may be employed. The air from the pipe 3 also forces the diaphragm 45 to the left, moving the valve 50 from its seat, and permitting air to flow from the pipe 2 (that connects to the equalizing reservoir of the air-brake system) through the small passages 51 into the chamber 42 and thence out through the passage 49.

This air escaping from the equalizing reservoir causes a gradual application of the air-brakes in the usual manner. In order to prevent accidents which might happen if the engineer or motorman should simultaneously open a passage from the equalizing reservoir independently of this speed controller, the pipe 2 and the pipe 62 leading to the manually operated brake-control valve should both connect to the same pipe 63 leading to the equalizing reservoir, as indicated in dotted lines. It will be understood that when this controller is mounted on any vehicle other than the engine it may be so connected as to discharge air from the brake pipe and thereby cause the application of the brakes.

It will be noticed that all three valves are of the "puppet" type where there is practically none of the seat wear and consequent leakage which always occurs when slide valves are employed, and that these puppet valves may be provided with the usual wear proof seats. As there are no slidable parts there is practically no friction, and the device is therefore very sensitive and positive in operation. The use of the diaphragm obviates the use of piston packing and the wear thereof.

It will be understood that the details and proportions of the parts may all be changed without departing from the spirit of our invention as set forth in the following claims.

We claim:—

1. In speed controller, the combination of a centrifugal governor and an adjustable actuating member moved thereby according to the speed of the governor, a valve casing having a series of chambers two of which are connected by a passage, a diaphragm and a valve connected thereto which valve is adapted to open and close the passage between said chambers, a pipe for air under pressure connecting into one of the two chambers, and a second pipe for air under pressure connecting into the chamber containing the diaphragm, and a valve actuated by the member operated by the governor when a predetermined speed has been attained to permit the flow of air into the chamber containing the diaphragm to cause the first mentioned valve to open said passage.

2. In a speed controller for vehicles, the combination of a pipe connecting to the equalizing reservoir of an air-brake system and a valve therefor, a diaphragm connected to the valve, a chamber in which the diaphragm is mounted, a pipe connecting to the chamber and to the main air reservoir of the system, a control valve to permit the flow of air from the air reservoir to said diaphragm chamber to cause the first named valve to permit air to flow from the equalizing reservoir, and a speed governor for opening the control valve when a predetermined speed is reached.

3. In a speed controller for vehicles, the combination of a main valve to permit the flow of air from the equalizing reservoir of the air brake system of a vehicle, a diaphragm connected to the valve and a chamber for the diaphragm, a passage leading from a source of air under pressure to the diaphragm chamber and a control valve to open the passage and means to open the valve when a predetermined speed is reached.

4. In a speed controller for vehicles, the combination of a main valve to permit the flow of air from the equalizing reservoir of the air brake system of a vehicle, a diaphragm connected to the valve and a chamber for the diaphragm, an inlet passage connecting to the chamber and a source of air under pressure, an outlet passage connecting the chamber, a valve to open and close said inlet passage, and adjustable means positioned according to the speed of the vehicle for opening the control valve when a predetermined speed has been reached.

5. In a speed controller for vehicles, the combination of a main valve to permit the flow of air from the equalizing reservoir of an air brake system, a diaphragm to move the valve from its seat, and means actuated when the vehicle has reached a predetermined speed to cause the movement of the diaphragm.

6. In a speed controller for vehicles, the combination of a main puppet valve to cause the setting of the brakes, a second puppet valve to permit the flow of air from the main air reservoir of the air-brake system, means connected to the main valve to open the same when the second valve is moved from its seat, and means driven by the vehicle to open the second valve when a predetermined speed is reached.

7. In a speed controller for vehicles, the combination of a valve casing, a main valve therein to permit the flow of air from the equalizing chamber of an air brake system of a vehicle, a diaphragm in the casing, a control valve in the casing to permit the flow of air from a main reservoir to the casing to force the diaphragm to move the first named valve from its seat, a governor and adjustable means connected thereto for moving the control valve from its seat, and a case inclosing the governor and the valve casing.

8. In a speed controller for vehicles, the combination of a main valve normally closing a discharge passage leading from the equalizing reservoir of an air brake system, means operable by the pressure of air to move said main valve from its seat, a conduit to convey the air necessary to operate the valve operating means, and a control valve actuated when the vehicle has reached a predetermined speed to open said conduit to cause the main valve to open the discharge passage from the equalizing reservoir.

MAURICE E. HAMILTON.
WILLIAM H. JOHNSON.

Copies of this patent may be obtained for five cents each, by addressing the "Commissioner of Patents, Washington, D. C."